United States Patent [19]

Gandini

[11] 4,266,426

[45] May 12, 1981

[54] APPARATUS FOR CALIBRATING THE RATE OF DELIVERY OF INJECTION PUMPS FOR DIESEL ENGINES

[75] Inventor: Roberto Gandini, Quinzano D'Oglio, Italy

[73] Assignee: Officine Meccaniche Odolini Catullo S.A.S. di Roberto Gandini & C., Quinzano D'Oglio, Italy

[21] Appl. No.: 885,006

[22] Filed: Mar. 9, 1978

[30] Foreign Application Priority Data

Mar. 9, 1977 [IT] Italy .............................. 21092 A/77

[51] Int. Cl.3 ........................ G01F 1/72; G01M 15/00

[52] U.S. Cl. ........................................ 73/119 A; 73/3

[58] Field of Search ................................. 73/3, 119 A

[56] References Cited

U.S. PATENT DOCUMENTS

| | | | |
|---|---|---|---|
| 3,119,258 | 1/1964 | Taylor | 73/119 A |
| 3,367,176 | 2/1968 | Emerson | 73/119 A |
| 3,475,955 | 11/1969 | Long | 73/119 A X |
| 4,073,304 | 2/1978 | Lerner et al. | 73/3 |
| 4,088,012 | 5/1978 | Emerson | 73/119 A |

FOREIGN PATENT DOCUMENTS

| | | | |
|---|---|---|---|
| 605833 | 6/1960 | Italy | 73/119 A |
| 44-20897 | 9/1969 | Japan | 73/119 A |

*Primary Examiner*—Daniel M. Yasich
*Attorney, Agent, or Firm*—Charles E. Brown

[57] ABSTRACT

For checking the rate of delivery of an injection pump for a Diesel engine, a vertical vessel is provided having a movable bottom wall formed by a piston-like member: the latter, via a mechanical transducer, reads the displacements of the piston as a function of the quantity of liquid delivered to the vessel by the pump being tested, the stop point being the top level in the vessel. The top level is signalled by a photoelectric device which spots the overflow of the liquid from the vessel top immediately as it occurs. Count-up or count-down means are provided for reading out the displacements of the piston so that, knowing the number of revolutions of the motor which drives the pump being tested, the exact rate of delivery of the pump can be calculated without being disturbed by any external cause of accidental errors.

7 Claims, 3 Drawing Figures

APPARATUS FOR CALIBRATING THE RATE OF DELIVERY OF INJECTION PUMPS FOR DIESEL ENGINES

The fuel injection pump of Diesel engines are subjected to functional tests and periodical upkeep operations which provide, more particularly, for the calibration of the volumetric rate of delivery of the pumps concerned. More particularly, it is imperative that the delivery per cycle of each of the pump-injector units of a fuel oil feed pump system of single- and plural-cylinder engines be metered with an extreme accuracy in order to be able to equalize the different rates of delivery to each other, in addition to calibrating, as it is obvious, said rates of delivery to the values which has been prescribed by the engine manufacturer as a function of the rpm rating.

As a rule, apparatus of the kind referred to above comprise a motor for driving the pumps being tested to a controlled number of revolutions per minute and a plurality of containers which receive, each, the delivery of a pumping unit of the pump system.

The measure of the rate of delivery is made by reading the volume of fuel which has been pumped out after a preselected number of revolutions of the pumps.

It is apparent that such a volume estimate has a paramount importance to the end of the performance of the measure taking. The use is widely spread of transparent vessels in which the pumped out fuel is collected, the volume of which is directly evaluated by scanning a calibrated scale. Such a way of taking readings gives indications which are poorly satisfactory in order that an accurate calibration of the pump may be achieved.

The object of the present invention is to provide an appratus in which the readout of the volume of fuel which is delivered by the pumping units takes place automatically without the disturbance of the subjective appreciation of an operator, and, in addition, in such a way as to be insensitive to external troubles such as the fact that the liquid is not motionless, the adhesion of liquid droplets to the collection vessel walls and similar disturbing phenomena which are anyhow susceptible of affecting the accuracy of the readout.

The apparatus according to this invention is composed by a plurality of vertically arranged cylindrical vessels, the bottom of each vessel being a piston which is reciprocable therein, whereas the vessels have at their tops an overflow port and means responsive to the presence of a liquid at the overflow level, a duct which receives the liquid from a pumping unit and which can be switched from a position in which the duct pours into the vessel to a position withdrawn therefrom and vice versa, the movable bottom piston of each vessel having means which lift it in a controlled manner.

The principal structural features of the invention and the advantages afforded thereby over the conventional devices will now be described in greater detail with reference to an embodiment of the invention to be illustrated in the accompanying drawings, wherein.

Figures 1, 2, 3:
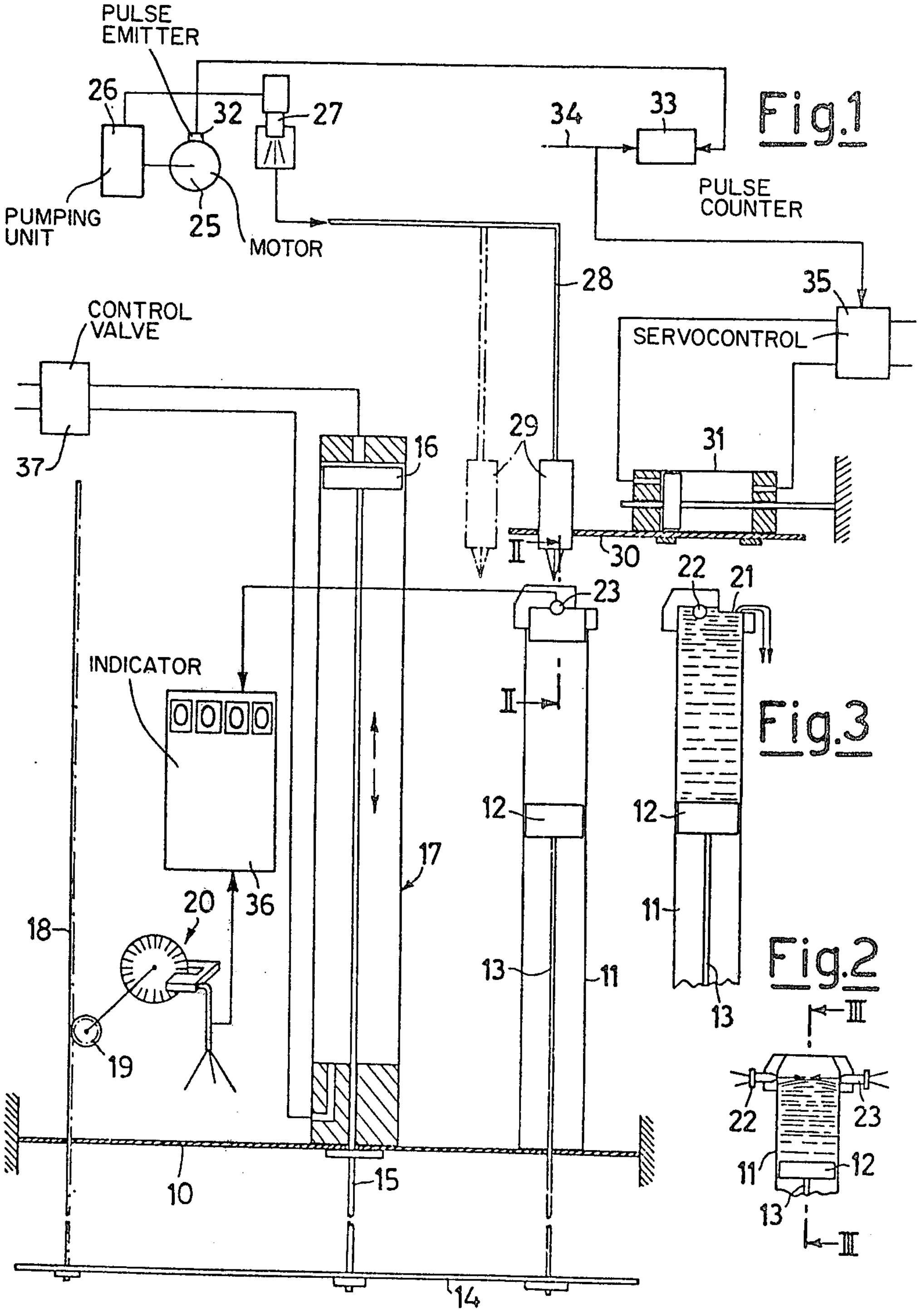
FIG. 1 is an overall diagram of an apparatus made according to this invention.
FIG. 2 is a cross-sectional view, taken along the line II—II of FIG. 1.
FIG. 3 is a cross-sectional view taken along the line III—III of FIG. 2.

Characteristically, the apparatus of the invention comprises a fixed supporting member 10, on which a certain number of vertical cylindrical vessels 11 are installed. The bottom wall of each vessel is a piston 12 which is reciprocable therein in a sealtight manner and is borne by a stem 13: the stem 13 is fastened to a plate 14 which, in its turn, is supported by the rod 15 of the piston 16 of a hydraulic jack 17 of the double-acting type controlled by a control valve 37.

Means are provided for sensing the vertical strokes of the plate 14, as exemplified by a rack 18 integral with 14 and meshing with a pinion 19. The rotation of pinion 19 actuates a transducer 20, which delivers a burst of pulses the number of which is proportional to the angle of rotation of the pinion and thus to the stroke of the piston 12.

The top portion of the vessel 11 is open and a portion 21 of its peripheral edge is a weir for the liquid contained therein. Exactly in registry with the weir level for the liquid at 21, a device for sensing the presence of a liquid is mounted, as exemplified by a light-emitting device 22, and a light-receiving device 23. The devices 22, 23 form first sensing means. Thus, as the liquid reaches the level at which it begins to overflow at 21, it breaks the light rays from 22 to 23 and the receiver 23 emits a corresponding signal.

In addition, the apparatus in question comprises a motor 25 for driving the pump 26 being tested, each pumping unit of which has its delivery side connected to a calibrated test atomizer 27, which, in its turn, discharges the pumped out liquid into a duct 28, the latter being terminated by a pouring spout 29. The pouring spout is carried by a cradle 30, which is moved by an actuator 31; so as to switch the spout from the solid line position, aligned with the vessel 11, and the dash-and dot position, withdrawn from the vessel.

It will be noted that the spout 29, in its position above the vessel 11, is so arranged that the liquid poured by the spout cannot have the light rays from 22 to 23 impinging thereon, so that no erroneous signal can be delivered by 23. This disclosure is restricted to a single vessel 11 of the apparatus and its attendant ancilliary apparatus. Stated another way, that portion of the apparatus which is described, services a single pumping unit of the pump 26. The apparatus, of course, can have any number of vessels such as 11 mounted on the supporting member 10 and having pistons 12 reciprocable therein, each connected to their respective stems and to the same plate 14. Each vessel will receive from its individual spout 29 the delivery of a pumping unit and the spouts 29 will be driven by a common actuator such as 31, or by discrete actuators which control the spouts simultaneously according to the convenience of construction in the individual cases.

The apparatus as described herein permits a convenient automation and an example of automation is given in a summary way.

The motor 25 has a pulse emitter 32 which drives an indicator counter 33 with a selector of the number of revolution of the motor, and thus of the delivery of the pump 26. The counter is enable to start counting by a manual signal 34 which simultaneously controls the servomechanism 35 to switch the actuator 31 so as to position the spout 29 to be aligned with the mouth of the vessel 11.

The transducer 20, which together with the rack 18 and the pinion 19 form second sensor means, delivers pulses to a counting indicator 36: the latter is latched by the light-receiving device 23 when the rays emitted by 22 are cut off. The transducer 20, of course in the case of plural vessel apparatus, delivers pulses also to other indicators 36, each attendant to a vessel 11 and latched by the respective level-sensing device.

The operation of the apparatus takes thus place as follows:

The motor 25 is started with the spout 29 offset from 11 until the rate of flow pouring through 29 from atomizer 27 and duct 28 becomes stabilized, while lowering the plate 14 to a reference end of a stroke of the plate 14, not shown. The signal 34 is then delivered and causes the spout 29 to be switched to the active position and counting at 33 is started. As soon as a preselected number of revolutions of the pump is made, the spout 29 is switched back to its inactive position shown in dash-and-dot lines of FIG. 1.

Now, the plate 14 is caused to rise from the bottom end stroke again, whereas at 36 the stroke of the piston 12 from the bottom is displayed, until the liquid collected at 11 intercepts the rays emitted by 22, so that 23 gives a block signal to 36.

The stroke of the piston 12 can be continued upwards, the liquid being discharged through the weir 21.

Thus, in such a stage, each of the counters 36 is brought to an indication which corresponds to the piston stroke and thus to the volume of the vessel 11 which has been displaced by the piston and which has caused the liquid overflow and the consequential interception of the rays 22–23. Such a counter can be calibrated in the most appropriate way and, more particularly, it can indicate, when the piston 12 is fully lowered, a figure corresponding the entire capacity of the vessel 11 and a countdown can be made as the piston is being raised. It is apparent that by so doing a direct indication of the volume of liquid at the instant of blocking of the indicator can be obtained, that is, the volume of the delivery which corresponds to the number of delivery runs of the pump as displayed at 33.

In an alternative embodiment, provisions can be made to have the counter 36 carrying out the counting steps only when it is so enabled by the signal delivered by the light-receiving device 23 as the liquid level attains the height sensed by such device. If so, the counter is nonresponsive to the upward stroke of the piston until the liquid reaches the overflow level and carries out, instead, a count-up during the entire stroke as required by the piston to complete its upward stroke and, also in this case, a direct indication of the volume of liquid poured by the spout into the cylindrical vessel is provided.

With such an embodiment, an opportunity is afforded to prevent that, at every readout, the piston is to attain the bottom dead center so that subsequent readouts are quickened.

As outlined above, above the plate 14 several vessels 11 are arranged, to each of which the delivery of one of the pumping elements of the pumping system 26 is attributed. For example, twelve vessels such as 11 can be provided, served by respective ducts 28 if the apparatus is intended to test injection pumps for engines having up to 12 cylinders.

The distribution of the vessels on the plate 14 can be any appropriate arrangement, either circular or rectilinear. At any rate the correct rectilinear vertical movement of the plate 14 must be provided for in order to equalize the strokes of the several pistons 12.

The movement of the pouring spout(s) relative to the vessel(s) can be obtained in a number of ways equivalent to those shown herein by way of example, it being only necessary that the rate of flow to be dispensed by the pumping element at the start and the end of the counting carried out by 33 to the vessel, or removed therefrom, be supplied with an adequate promptness.

The test apparatus according to the invention is conducive to highly accurate results and readout is extremely easy. It will be noted that the readout taken in this apparatus is unaffected by errors deriving from deposits of dispensed liquid on the walls of the vessels 11, since the entire liquid volume is swept away by the piston 12 as the readout is taken.

The use of a level sensor in the form of a luminous beam sighting line has proven to afford a considerable sensitivity and accuracy. However, any equivalent level-sensing device can be used, which is capable of delivering a signal for driving the member having the task of indicating the stroke that the piston must travel over prior that the liquid reaches the sensed level.

As a rule, still within the scope of the present invention, a number of changes can be introduced therein by replacing a few component parts by functionally equivalent parts.

I claim:

1. An apparatus for measuring the rate of delivery of a liquid pumping unit, particularly for an injection pump for a Diesel engine, said apparatus comprising a pumping unit, motor means for driving said pumping unit, at least one vertically disposed cylindrical vessel having an open top end, a duct fed by said pumping unit opening into said vessel through said open top for selectively causing discharge of liquid from said pumping unit into said vessel, counting means for counting the number of revolutions of said motor means, control means for simultaneously starting the discharge of liquid into said vessel and the operation of said counting means, said counting means being operable to stop said discharge of liquid when said counting means reaches a preselected number, said vessel having a bottom wall in the form of a piston axially movable within said vessel, driving means operable at the end of each liquid discharging period of said duct for moving said piston axially from a lowered rest position to a top position to cause the received liquid to overflow from the vessel through an overflow cutaway arranged at a predetermined overflow level, first sensing means arranged at said overflow level for sensing the attainment of said overflow level by said discharged liquid and then sensing when said piston is in said top position, second sensing means for sensing the lifting movement of said piston, and a piston stroke indicator controlled by said first and second sensing means for indicating the stroke of said piston from the position at which said discharged liquid reaches said overflow level to said top position of said piston, said indicated piston stroke being thus representative of the volume of liquid discharged during said preselected number of revolutions of said motor means and therefore representative of the rate of delivery of said pumping unit.

2. An apparatus according to claim 1, wherein said indicator is preset to indicate a starting value corresponding to to the distance between said rest and top positions of the piston and is controlled by said second sensing means so as to progressively decrease the indicated value as the piston is lifted, said first sensing means controlling said indicator so as to stop the indicated value when the discharged liquid reaches said overflow level.

3. An apparatus according to claim 1, wherein said indicator is preset to indicate at rest a zero value and is controlled by said second sensing means so as to progressively increase the indicated value as the piston is lifted, said sensing means controlling said indicator so as to start increasing of the indicated value when the discharged liquid reaches said overflow level and to stop said increasing when the piston reaches the top position.

4. An apparatus according to claim 1, wherein said driving means comprise a hydraulic jack including a piston stem rigidly connected to said movable piston, said second sensing means being operatively connected to said piston stem so as to sense the stroke of said piston stem during the lifting of said movable piston.

5. An apparatus according to claim 4, wherein said second sensing means include a transducer which converts the movement of said piston stem into a train of pulses.

6. An apparatus according to claim 5, wherein said indicator is a pulse counter.

7. An apparatus according to claim 1, wherein said duct terminates in a spout movable between a position at which said spout is aligned with the top end of said vessel to discharge liquid thereinto and a position at which the spout is removed from alignment with said vessel.

* * * * *